United States Patent
Williams et al.

(10) Patent No.: US 7,272,846 B2
(45) Date of Patent: Sep. 18, 2007

(54) SYSTEM AND METHOD FOR DETECTING AND REPORTING CABLE MODEMS WITH DUPLICATE MEDIA ACCESS CONTROL ADDRESSES

(75) Inventors: Chris Williams, Potomac Falls, VA (US); Kenneth Gould, Oakton, VA (US)

(73) Assignee: Time Warner Cable, a division of Time Warner Entertainment Company, LP, Stamford, CT (US)

( * ) Notice: Subject to any disclaimer, the term of this patent is extended or adjusted under 35 U.S.C. 154(b) by 822 days.

(21) Appl. No.: 10/325,269

(22) Filed: Dec. 20, 2002

(65) Prior Publication Data

US 2004/0123329 A1 Jun. 24, 2004

(51) Int. Cl.
- H04N 7/173 (2006.01)
- H04N 7/16 (2006.01)
- H04L 12/66 (2006.01)
- G06F 11/00 (2006.01)
- G06F 12/16 (2006.01)
- G06F 12/14 (2006.01)

(52) U.S. Cl. .................. 725/111; 725/25; 725/30; 725/115; 726/23; 726/24

(58) Field of Classification Search .................. None
See application file for complete search history.

(56) References Cited

U.S. PATENT DOCUMENTS

| | | | | |
|---|---|---|---|---|
| 5,467,382 A * | 11/1995 | Schorman | ................... | 455/410 |
| 5,724,510 A | 3/1998 | Arndt et al. | | |
| 5,884,024 A * | 3/1999 | Lim et al. | ...................... | 726/3 |
| 6,195,689 B1 * | 2/2001 | Bahlmann | .................. | 709/217 |
| 6,393,484 B1 * | 5/2002 | Massarani | .................. | 709/227 |
| 6,493,340 B1 * | 12/2002 | Kawanaka | .................. | 370/392 |
| 6,603,758 B1 * | 8/2003 | Schmuelling et al. | ....... | 370/352 |
| 6,654,387 B1 * | 11/2003 | Beser et al. | ................. | 370/485 |
| 6,697,862 B1 * | 2/2004 | Beser et al. | ................. | 709/226 |
| 6,745,333 B1 * | 6/2004 | Thomsen | ..................... | 726/23 |

(Continued)

OTHER PUBLICATIONS

Droms, "RFC 2131: Dynamic Host Configuration Protocol", Mar. 1997, http://www.ietf.org/rfc/rfc2131.txt?number=2131.*

(Continued)

Primary Examiner—Taghi Arani
Assistant Examiner—Arezoo Sherkat
(74) Attorney, Agent, or Firm—Roberts Mardula & Wertheim, LLC (57) ABSTRACT

The detection of devices with duplicate media access controller (MAC) addresses in a cable network. A cable modem (CM) having a MAC address is connected by the cable network to a cable modem termination system (CMTS) having a gateway interface address. A centralized storage of historical cable modem MAC address/giaddr pair data is used to identify cable modems (CM's) that report duplicate MAC addresses. A server tracks the CM MAC address/giaddr pair data of all CM requests that it receives and stores the MAC address/giaddr pair data into a datastore (such as a database). When a CM seeks to access the network, the server looks into the datastore to determine whether the CM MAC address of the CM has previously been stored with a different associated giaddr, which would imply that there are multiple CMs attached to different CMTSs where the CMs share the same MAC address. If such duplication is detected, a appropriate remedial response is taken.

27 Claims, 3 Drawing Sheets

U.S. PATENT DOCUMENTS

| | | | |
|---|---|---|---|
| 6,859,826 B2* | 2/2005 | Bahlmann | 709/220 |
| 2002/0023160 A1* | 2/2002 | Garrett et al. | 709/229 |
| 2002/0023174 A1* | 2/2002 | Garrett et al. | 709/245 |
| 2002/0165972 A1* | 11/2002 | Chien et al. | 709/229 |
| 2004/0103314 A1* | 5/2004 | Liston | 713/201 |
| 2006/0104280 A1* | 5/2006 | Carolan et al. | 370/393 |

OTHER PUBLICATIONS

Staniford et al., "How to 0wn the Internet in Your Spare Time", Proceedings of the 11th USENIX Security Symposium (Security '02), Aug. 8, 2002.*

* cited by examiner

FIGURE 2

SYSTEM AND METHOD FOR DETECTING AND REPORTING CABLE MODEMS WITH DUPLICATE MEDIA ACCESS CONTROL ADDRESSES

FIELD OF INVENTION

The present invention relates generally to the field of network management. More particularly, the present invention permits the detection of devices with duplicate media access controller (MAC) addresses.

BACKGROUND OF INVENTION

Every network interface has a media access controller (MAC) address, also known as the physical address. This is the actual hardware address that the lowest level of the network uses to communicate. The MAC address is used to assign the IP address to a device by means of a dynamic host configuration protocol (DHCP) server.

The MAC address is theoretically unique to a particular device. This permits an IP network service provider to use the MAC address as a vehicle for authorizing access to its network and further aids in billing users for services. In the cable environment, access to the cable network's data service is provided through a cable modem (CM). Increasingly, CMs are required to comply with an industry standard referred to as the "Data Over Cable Service Interface Specification" or DOCSIS. DOCSIS provides a set of standards and a certifying authority by which cable companies can achieve cross-platform functionality in Internet delivery. A DOCSIS compliant cable network comprises cable modem termination systems (CMTSs) and cable modems that form the interface to an Internet service provider (ISP). The CM modem provides two-way connectivity between a customer and the ISP through the CMTS. A cable modem termination system (CMTS) is a component that exchanges digital signals with cable modems on a cable network.

A data service is delivered to a subscriber through channels in a coaxial cable to a CM. An upstream channel is used to communicate from the CM to the CMTS. A downstream channel handles communication from the CMTS to the CM. When a CMTS receives signals from the CM, the CMTS converts these signals into Internet Protocol (IP) packets, which are then sent to an IP router for transmission across the Internet or service provider network. When a CMTS sends signals to a cable modem, the CMTS modulates the downstream signals for transmission across the cable to the cable modem.

Ideally, at the time of manufacture a CM is assigned a MAC address that uniquely identifies that cable modem. Either through error at the time of manufacture, or through malicious intent (hacking), a cable modem may appear on a cable network with a MAC address that has already been assigned to another cable modem. As the MAC address is often the sole identifier used to identify and authenticate a cable modem in order to provide cable modem network connectivity and for billing purposes, it is imperative to guarantee the uniqueness of the MAC address for each cable modem in order to thwart "theft of services."

The DHCP server uses the CM MAC address to determine whether a customer should receive cable modem service (based on finding the MAC address in a provisioning/authentication database) and what kind of service should be received. If a "rogue" cable modem were to share the same MAC address as a legitimate cable modem, the "rogue" would receive the same level of service as the legitimate CM. If the legitimate cable modem user is charged for service based upon the quantity of service used, it is likely that the legitimate user will be charged for the bandwidth consumed by the "rogue" CM that shares the same MAC address.

Typically, when a CM is connected to a cable network and powered on, the CM issues a DHCP request message requesting that an IP address be assigned to that CM. The DHCP request message contains the CM's MAC address. The CMTS receives the DHCP request and adds its own unique identifier (typically referred to as a gateway interface address or "giaddr") to the DHCP request. The giaddr identifies the CMTS through which the CM is communicating and is used by the DHCP server to determine from which pool of IP addresses a specific IP address for the CM will be selected. Thus, the intended function of the giaddr is to aid in the assignment of IP addresses.

In some cable systems, the CMTS will have a look-up table of CM MAC addresses and logic to deny access to a CM when the MAC address is not in the look-up table. Additionally, this type of CMTS may also reject the second occurrence of a MAC address presented to it. (In such cable systems, the CM "registers" with the CMTS so that only one CM with a specific MAC address may be connected at any one time.) However, even in configurations where the CMTS accesses MAC data, the CMTS is not able to discern whether the CM that presented the first MAC address to the CMTS was the legitimate CM or user of an unauthorized a cable modem that is not entitled to recieve service from the cable operator. Further, the CMTS has no way of knowing whether a CM's MAC address is being used on another CMTS.

What is needed is a means for identifying network devices having the same MAC address.

SUMMARY OF INVENTION

An embodiment of the present invention is a method for detecting multiple cable modems on a cable modem network that have the same MAC address. The MAC address of a cable modem is associated with the giaddr of the CMTS to which the cable modem is connected to form a MAC address/giaddr pair. A datastore stores historical MAC address/giaddr pair data. In one embodiment of the present invention, that datastore comprises a central database. In an alternative embodiment, the datastore comprises a distributed database. By comparing the MAC address/giaddr pair data of a cable modem seeking to access a cable network to the MAC address/giaddr pair data in the datastore, duplicate MAC addresses can be detected and managed.

It is therefore an aspect of the present invention to detect and identify cable modems having the same MAC address.

It is another aspect of the present invention to detect an overt attempt over a cable network to capture a legitimate MAC address by a user of a cable modem that is not entitled to receive service from the cable operator.

It is still another aspect of the present invention to associate a cable modem with a primary cable modem termination system.

An embodiment of the present invention is a method for detecting multiple cable modems on a cable modem network that have the same MAC address. In this embodiment, a centralized storage of historical CM MAC address/giaddr pair data is used to identify CMs with duplicate MAC addresses. The DHCP server tracks the CM MAC address/giaddr pair data of all DHCP requests that it receives and stores the CM MAC address/giaddr pair data into a datastore (such as a database). When DHCP requests are received, the DHCP server looks into the datastore to determine whether the CM MAC address embedded in the DHCP request has previously been stored with a different associated giaddr. If this has occurred, it would imply that one of three events has occurred: (1) the CM has been physically moved to a different part of the cable infrastructure so that it is connecting through a different CMTS: (2) the CM has been assigned to a new CMTS to accommodate a change in the system structure (as, for example where a new CMTS has been added to account for subscriber count growth); or (3) there are CMs with the same MAC address each requesting an IP address through different CMTSs attached to the DHCP server. When such duplication is detected, the DHCP server takes a prescribed remedial response (e.g., denies the duplicate registration) and sends a message to an error log and to a monitoring system that alerts support personnel. For CMs that the DHCP has not previously issued an IP address, the DHCP server will write the MAC address/giaddr pair data to the datastore.

In an alternate embodiment, the CM MAC address/giaddr pair data is periodically gathered from the CMTS and stored in the datastore. In another embodiment, the DHCP server does not perform the tasks of storing the MAC address/giaddr pair data in the datastore, identifying duplicate MAC addresses, and generating alarms for support personnel. Rather, in this embodiment, these tasks are assigned to a separate detection server so as to avoid overburdening the DHCP server.

In yet another embodiment of the present invention a multiple service operator (MSO) uses a regionalized provisioning system to validate customers. (A MSO is a service provider that operates two or more distinct cable networks.) The MAC address/giaddr pair data is gathered from each distinct network and replicated in a centralized datastore. A process monitors this centralized datastore to detect duplicate MAC addresses that are associated with the same or differing CMTSs and to alert support personnel appropriately. In this way, the duplicate MAC addresses can be detected across discrete networks.

In yet another embodiment, DHCP logs are parsed to perform historical trending. A log processor looks for patterns to determine whether a "rogue" cable modem user is changing his CM MAC address over and over again in an attempt to find a legitimate CM MAC address that will allow his modem to become provisioned. This process examines the DHCP logs and looks for unusually high numbers of DHCP failures due to CMs with MAC addresses that the provisioning system does not recognize. The process also looks for patterns among all MAC addresses that fail in order to determine the location of a "rogue" CM (based upon which individual CMTS the rogue CM is attempting to provision through), as well as to determine the methods being used by the abuser. In an alternate embodiment, historical trending is used to determine the validity of a MAC address proffered by a CM attempting to access a cable system.

In still another embodiment of the present invention, the centralized data store associates a MAC address with the first CMTS that receives that MAC address. If a MAC address is subsequently received from a different CMTS (as determined by the giaddrs), a response may be taken to determine whether either or both of the uses of the MAC address are by a legitimate user using a single CM or if the MAC address is being used by different CMs. In this embodiment, the initiation of a response is not dependent upon the simultaneous use of the same MAC address by different CMs.

For example, a legitimate user may move a CM from one regional network to another regional network of an MSO. In this example, the detection of the CM MAC address from the CMTS of the second regional network would provoke a remedial response from the MSO. The nature of the remedial response is within the discretion of the MSO. By way of illustration and not as a limitation, the CM could be granted temporary access and sent a confirmation message by the MSO requesting the CM user to respond with a confirmation code. If the CM user fails to respond or if the confirmation code is in error, the temporary access would be terminated. Otherwise, the temporary is upgraded to "normal" access. As would be apparent to those skilled in the art, other remedial responses may be initiated by the MSO without departing from the scope of the present invention.

In alternative embodiment, when a new subscriber is issued a CM, the MAC address of the CM and giaddr of the CMTS to which the new subscriber is assigned are saved in a datastore. When the new subscriber first powers on to the network, the CM sends a DHCP request to the DHCP server. In this embodiment, the DHCP server looks into the datastore to determine whether both the CM MAC address embedded in the DHCP request and the giaddr match the values assigned to them when the CM was issued. If not, a prescribed remedial response is taken. If the CM MAC address and the giaddr match, the CM is granted temporary access and sent a confirmation message requesting the CM user to respond with a confirmation code. If the CM user fails to respond or if the confirmation code is in error, the temporary access is terminated. Otherwise, the temporary is upgraded to "normal" access.

DETAILED DESCRIPTION OF THE PRESENT INVENTION

Figure 1:
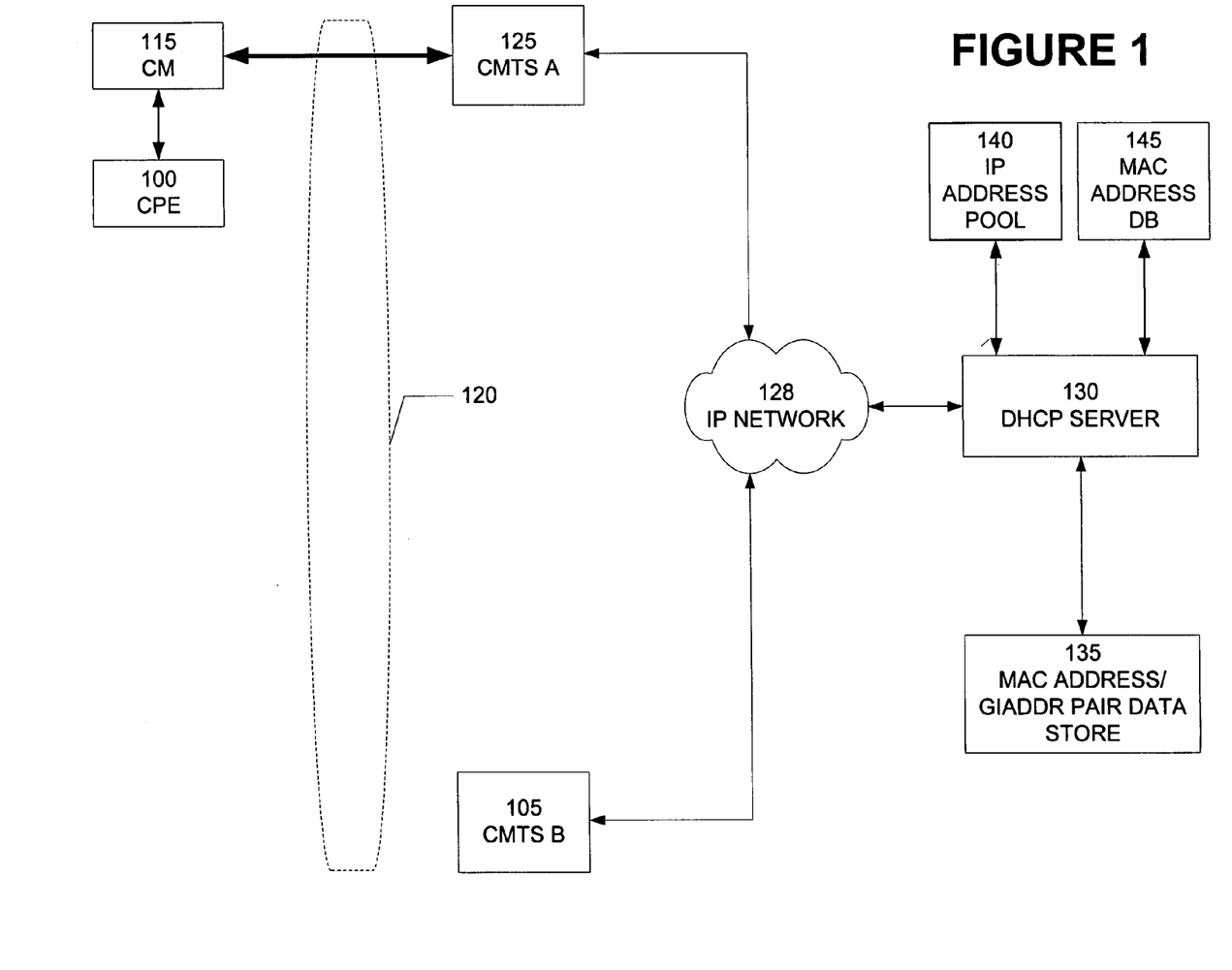
FIG. 1 is a block diagram illustrating an embodiment of the present invention in which duplicated MAC addresses are detected in a single network with a plurality of CMTSs.

An embodiment of the present invention is a method for detecting multiple cable modems on a cable modem network that have the same MAC address. FIG. 1 is a block diagram illustrating an embodiment of the present invention in which duplicated MAC addresses are detected in a single network with a plurality of CMTSs. Referring to FIG. 1, customer premises equipment (CPE) 100 is connected to cable modem (CM) 115 that in turn interfaces to cable network 120. CM 115 connects to cable modem termination system (CMTS) A 125 via cable network 120. Cable network 120 also terminates at CMTS B 105 so that a Cable network 120 terminates at multiple cable modem termination systems. A CM is identifiable on the network by a unique MAC address assigned to the CM at the time of manufacture. A CMTS is identified by a gateway interface address (a "giaddr"). Both CMTS A 125 and CMTS B 105 interface with an IP network 128. Connected to IP network 128 are DHCP server 130 and a datastore 135. Datastore 135 stores MAC address/giaddr pair data of CMs that have been authorized to access cable network 120.

Additionally, the DHCP server 130 is connected to IP address pool 140 and MAC address database 145. In an embodiment of the present invention, the MAC address database is created when a CM is assigned to a subscriber of IP service from the operator of cable network 120. The DHCP server 130 selects an IP address for the CM 115 based on the CMTS A 125 that the CM 115 uses for its network connection. A CMTS A 125 is identified to DHCP server 130 by the giaddr of the CMTS.

Figure 2:
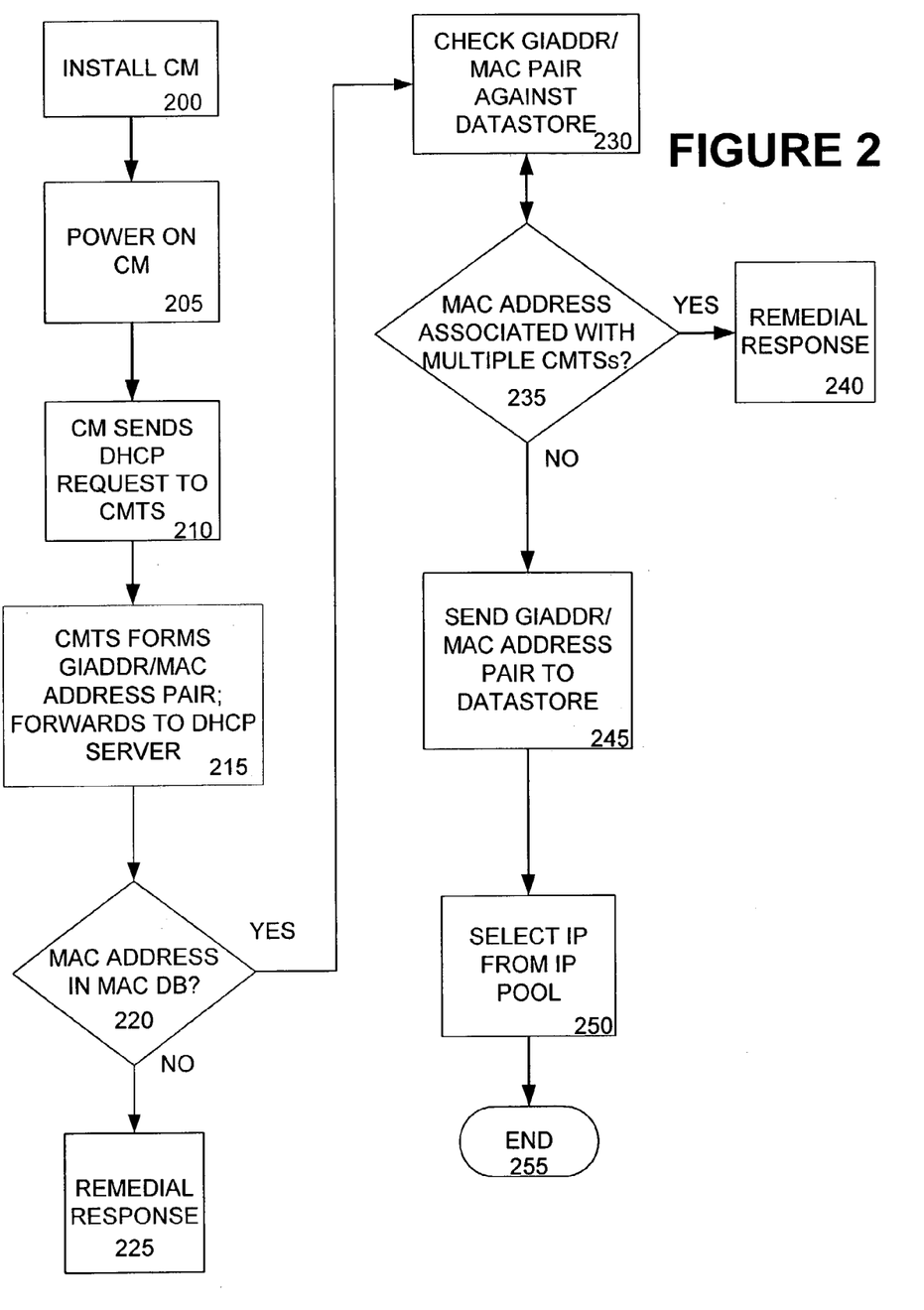
FIG. 2 is a flowchart illustrating a process by which duplicated MAC addresses are detected in a single network with a plurality of CMTSs according to an embodiment of the present invention.

The functionality of these components is illustrated by FIG. 2. FIG. 2 is a flowchart illustrating a process by which duplicated MAC addresses are detected in a single network with a plurality of CMTSs according to an embodiment of the present invention. A CM is installed 200 and connected to a cable network. The CM is powered on 205 and sends a DHCP request to the CMTS 210. The CMTS adds a giaddr to the DHCP request and routes the request to a DHCP server 215. The DHCP server determines whether the MAC address is in the MAC database 220. If the MAC address is not in the MAC database 220, remedial response is taken 225. The network administrator determines what is an appropriate remedial response. Typically, where the MAC address is not in the MAC database 220, the user is denied service. However, the invention is not so limited and other actions may be taken (such as continuing to monitor for fraud source and pattern detection) without departing from the scope of the invention.

If the MAC address is in the MAC database 220, the MAC address/giaddr pair data from the CMTS is compared to existing MAC address/giaddr pair data stored in a datastore 230. A determination is made whether the MAC address of the MAC address/giaddr pair data sent from the DHCP server matches a MAC address previously associated with a giaddr 235. If a MAC address has been previously associated with a different giaddr, a remedial response is taken 240. The network administrator determines what is an appropriate remedial response. For example, and not as a limitation, the remedial response comprises denying an IP address to the CM, sending an advisory message to a network administrator, or recording the event in a log file. In yet another embodiment, duplicate MAC addresses are referred to a separate server for processing, thereby relieving the DHCP of the processing burden. In this embodiment, the detection of a duplicate MAC addresses may occur after an IP address has been assigned to both the CM entitled to use the MAC address and to the CM that has pirated the MAC address. An appropriate remedial response is taken to revoke the IP address of the CM using the pirated MAC address.

If the MAC address/giaddr pair data is unique, the MAC address/giaddr pair data is stored in the central MAC address/giaddr datastore 245. The CM is assigned an IP address from the IP address pool associated with the CMTS 250 and the process ends 255.

Figure 3:
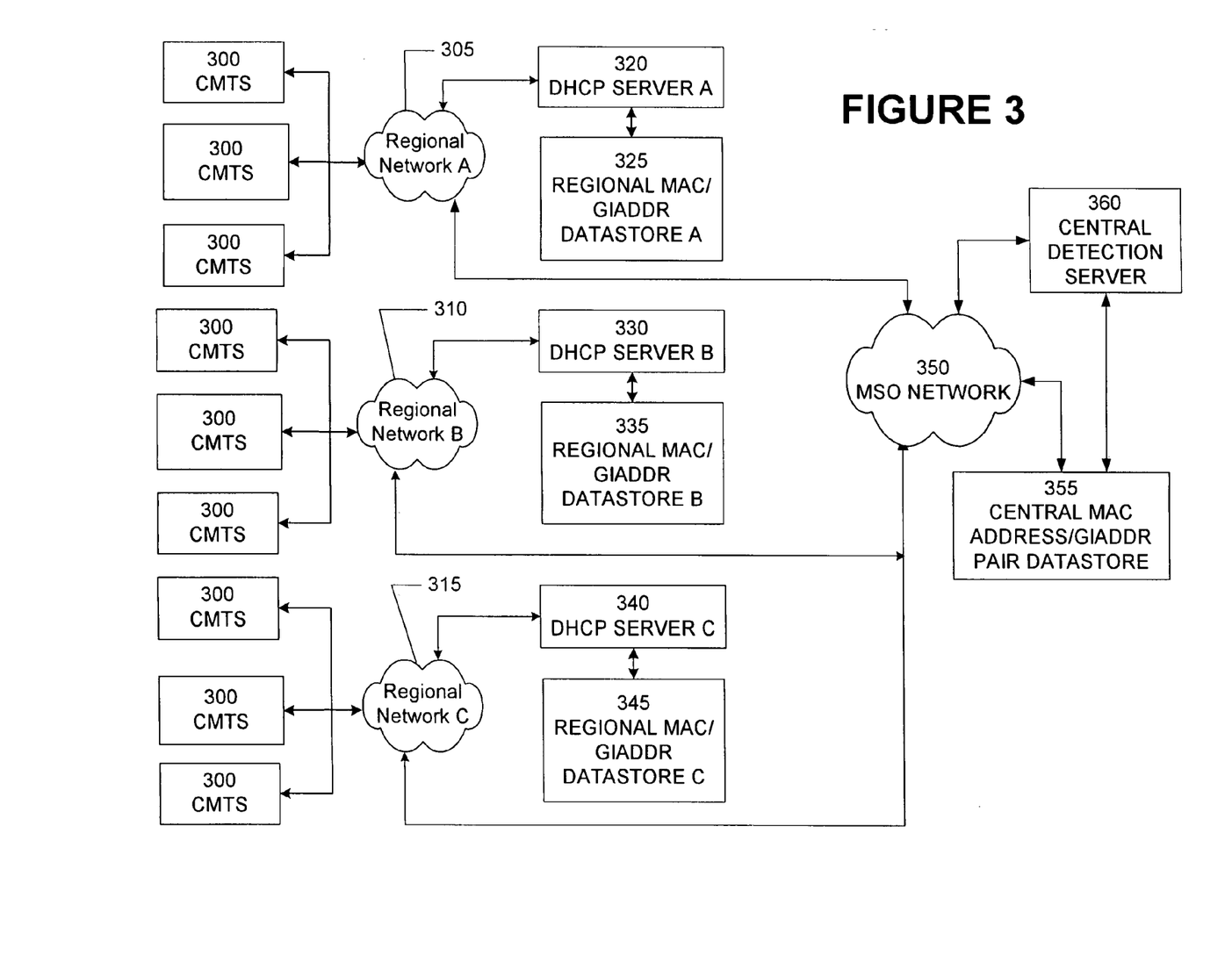
FIG. 3 is a block diagram illustrating an embodiment of the present invention in which duplicate MAC addresses are detected on a plurality of networks using a plurality of CMTSs.

In another embodiment, a cable system comprising multiple networks is served by a datastore. Referring to FIG. 3, a cable system operated by a multiple system operator (MSO) is illustrated. For clarity, cable modems, customer premises equipment, the MAC address database and the IP address pool (illustrated in FIG. 1) are not shown. Regional network A 305, regional network B 310 and regional network C 315 each are connected to multiple CMTSs 300. While only three regional networks are illustrated, the present invention is not so limited. Any number of regional networks each connected to any number of CMTSs may be served by the present invention without departing from its scope.

Each regional network is connected to a DHCP server that in turn is connected to a regional datastore MAC address/giaddr pair data. As illustrated, regional network A 305 is connected to DHCP server A 320, which is connected to regional MAC address/giaddr datastore A 325. Similarly, regional network B 310 is connected to DHCP server B 330 which is connected to regional MAC address/giaddr datastore B 335, and regional network C 315 is connected to DHCP server A 340 which is connected to regional MAC address/giaddr datastore A 345. Additionally, each regional network is connected to multiple service operator (MSO) network 350. A central MAC address/giaddr datastore 355 is also connected to MSO network 350.

In this embodiment, a CM is serviced by a CMTS connected to a regional network. Within the regional network, the process of checking for MAC address/giaddr pair data is as describe above in reference to FIG. 1. By way of example, each request for a MAC address received by DHCP Server A 320 is passed to the regional MAC address/giaddr datastore A 325. There, the MAC address is checked against previously registered MAC address/giaddr pair data to determine if the MAC address is already associated with a different CMTS.

If CMs with a the same MAC address were to be used on different regional networks, a regional MAC address/giaddr datastore would not have a record of such usage on the other regional network and the duplicate MAC addresses. To detect multiple usage of singular MAC addresses across multiple networks, the MAC address/giaddr pair data from all of the regional networks are forwarded to a central MAC address/giaddr datastore 355. After a request for an IP address received by a DHCP server is handled regionally, the request is sent over the MSO network 350 to central MAC address/giaddr datastore 355 to determine if the MAC address is in use on any of the regional networks comprising the network of the multiple service operator.

In another embodiment of the present invention, the CM MAC address/giaddr pair data is periodically gathered from the CMTS and the MAC address/giaddr pair data stored in a datastore. In this embodiment, a separate process (disassociated from the DHCP server processes) is used to monitor the MAC address/giaddr pair data in the datastore, identify duplicate MAC addresses, and generate alarms for support personnel. Referring to FIG. 3, a central detection server 360 is linked to a central MAC address/giaddr pair datastore 355. The central detection server 360 performs the separate processes described above.

In another embodiment, the MAC address/giaddr datastore is also mined for unusual IP address requests. In this embodiment, MAC addresses that are not found by the DHCP server (rejected MAC addresses) are also stored in the MAC address/giaddr datastore. The rejected MAC addresses are analyzed to determine if a hacker is attempting to find a MAC address within the MAC address database 140 (see FIG. 1). By way of example, and not as a limitation, MAC addresses received by the DHCP that are incremented sequentially over a short period of time would be flagged as evidence that a hacker was attacking the cable network.

In one embodiment, the present invention comprises methods for detecting access of a cable system by an unauthorized cable modem. A cable network comprises a plurality of cable modems each linked through the cable network to one of a plurality of cable modem termination systems. A method for detecting access of the cable system by an unauthorized cable modem comprises receiving, at one of the plurality of cable modem termination systems, a MAC address proffered by a cable modem seeking access to the cable system. A proffered identifier of the cable modem seeking access to the cable system is formed by combining the gateway interface address of the cable modem termination system with the proffered MAC address. The proffered identifier is stored in a data store.

In yet another embodiment of the present invention, the method also comprises comparing the proffered identifier of the cable modem seeking to access the cable network to the identifiers stored in the datastore. A determination is made whether the MAC address component of the proffered identifier matches the MAC address component of one or more stored identifiers.

In another embodiment of the present invention, the cable network further comprises a DHCP server linked to the plurality of cable modem termination systems. The DHCP server determines if the MAC address component of the proffered identifier matches the MAC address component of one or more stored identifiers.

In still another embodiment of the present invention, the method further comprises making a determination whether the MAC address component of the proffered identifier matches the MAC address component of a stored identifier having a gateway interface address component that does not match the gateway interface component of the proffered identifier. In the event the MAC address component of the proffered identifier matches the MAC address component of a stored identifier having a gateway interface address component that does not match the gateway interface component of the proffered identifier, a remedial response is selected. In another embodiment of the present invention, in the event the proffered identifier does not match a stored identifier, the proffered identifier is stored in the datastore.

In an embodiment of the present invention, the cable system comprises a datastore and a central network linked to a plurality of regional networks, wherein each of the regional networks comprises a plurality of cable modems each linked through the cable system to one of a plurality of cable modem termination systems. A method for detecting access of the cable system by an unauthorized cable modem, comprises receiving, at one of the plurality of cable modem termination systems, the MAC address proffered by a cable modem seeking access to the cable system through a regional network. A proffered identifier of the cable modem seeking access to the cable system is formed by combining the gateway interface address of the cable modem termination system with the proffered MAC address. The proffered identifier is stored in a datastore.

In yet another embodiment of the present invention, the method further comprises comparing the proffered identifier of the cable modem seeking to access the cable network to the identifiers stored in the datastore. A determination is made whether the MAC address component of the proffered identifier matches the MAC address component of one or more stored identifiers.

In yet another embodiment of the present invention, the cable network further comprises a DHCP server linked to the plurality of cable modem termination systems. The DHCP server determines if the MAC address component of the proffered identifier matches the MAC address component of one or more stored identifiers.

In still another embodiment of the present invention, the method further comprises making a determination whether the MAC address component of the proffered identifier matches the MAC address component of a stored identifier having a gateway interface address component that does not match the gateway interface component of the proffered identifier. In the event the MAC address component of the proffered identifier matches the MAC address component of a stored identifier having a gateway interface address component that does not match the gateway interface component of the proffered identifier, a remedial response is selected.

In yet another embodiment of the present invention, if the cable modem is granted access to the cable network, the proffered identifier of the cable modem seeking to access the cable network is compared to the identifiers stored in the datastore. In the event the proffered identifier does not match a stored identifier, the proffered identifier is stored in the datastore.

In an embodiment of the present invention, a cable system comprises a plurality of cable modems each linked through the cable system to one of a plurality of cable modem termination systems and a datastore, and wherein the datastore has stored therein a plurality of unauthorized MAC addresses. A method for detecting access of a cable system by an unauthorized cable modem, comprises receiving a MAC address proffered by a cable modem seeking access to the cable system for which access to the cable system was denied. The proffered MAC address is compared to the unauthorized MAC addresses stored in the datastore. A determination is made whether the proffered MAC address and one or more of the unauthorized MAC addresses stored in the datastore are related. In the event the proffered MAC address and one or more of the MAC addresses stored in the datastore are related, a remedial response is selected. In an another embodiment of the present invention, determining whether the proffered MAC address and one or more of the MAC addresses stored in the datastore are related comprises determining whether the proffered MAC address and one or more of the MAC addresses stored in the datastore are related temporally, sequentially, or by manufacturer code.

In an embodiment of the present invention, a system for detecting access of a cable comprises a plurality of cable modems each linked through the cable network to one of a plurality of cable modem termination systems. Each of the plurality of cable modem termination systems are adapted to receive a MAC address proffered by a cable modem seeking access to the cable network and to form a proffered identifier of the cable modem seeking access to the cable system by combining the gateway interface address of the cable modem termination system with the proffered MAC address. A datastore is adapted to receive the proffered identifier.

In another embodiment of the present invention, the system further comprises a detection server linked to the datastore. The detection server comprises a processor. The processor is adapted to enable the detection server to receive a proffered identifier from a cable modem termination system, to compare the proffered identifier of the cable modem seeking to access the cable network to the identifiers stored in the datastore, and to determine whether the MAC address component of the proffered identifier matches the MAC address component of an identifier stored in the datastore.

In another embodiment of the present invention, the processor is further adapted to determine if the MAC address component of the proffered identifier matches the MAC address component of a stored identifier having a gateway interface address component that does not match the gateway interface component of the proffered identifier, and in the event the MAC address component of the proffered identifier matches the MAC address component of a stored identifier having a gateway interface address component that does not match the gateway interface component of the proffered identifier, to select a remedial response.

In still another embodiment of the present invention, the processor is further adapted to enable the detection server to determine whether to grant to the cable modem seeking to access the cable network access. In the event access is granted, the proffered identifier of the cable modem seeking to access the cable network is compared to the identifiers stored in the datastore. In the event the proffered identifier does not match a stored identifier, the proffered identifier is stored in the datastore.

In even another embodiment of the present invention, the detection server comprises a DHCP server.

In another embodiment of the present invention, the cable network further comprises a central network linked to a plurality of regional networks and the plurality of cable modem termination systems are linked to one of the plurality of regional networks.

In an embodiment of the present invention, a cable network comprises a plurality of cable modems each linked through the cable network to one of a plurality of cable modem termination systems. A method for detecting access of a cable system by an unauthorized cable modem comprises receiving, at one of the plurality of cable modem termination systems, a MAC address proffered by a cable modem seeking access to the cable system. A proffered identifier of the cable modem seeking access to the cable system is formed by combining the gateway interface address of the cable modem termination system with the proffered MAC address. A determination is made whether to grant to the cable modem seeking to access the cable network access. In the event access is granted, the proffered identifier of the cable modem seeking to access the cable network is compared to the identifiers stored in the datastore. In the event the proffered identifier does not match a stored identifier, the proffered identifier is stored in the datastore. The proffered identifier of the cable modem seeking to access the cable network is compared to the identifiers stored in the datastore. A determination is made whether the MAC address component of the proffered identifier matches the MAC address component of one or more stored identifiers. Another determination is made whether the MAC address component of the proffered identifier matches the MAC address component of a stored identifier having a gateway interface address component that does not match the gateway interface component of the proffered identifier. In the event the MAC address component of the proffered identifier matches the MAC address component of a stored identifier having a gateway interface address component that does not match the gateway interface component of the proffered identifier, a remedial response is selected.

In still another embodiment of the present invention, the cable network further comprises a DHCP server linked to the plurality of cable modem termination systems. The DHCP server determines if the MAC address component of the proffered identifier matches the MAC address component of one or more stored identifiers.

In even another embodiment of the present invention, the cable network further comprises a DHCP server linked to the plurality of cable modem termination systems. The DHCP server determines if the MAC address component of the proffered identifier matches the MAC address component of a stored identifier having a gateway interface address component that does not match the gateway interface component of the proffered identifier.

A system and method for detecting and reporting cable modems with duplicate media access control addresses has been described. It will be understood by those skilled in the art of the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A method for detecting unauthorized access of a cable system by a cable modem, the method comprising:
   receiving at a cable modem termination system (CMTS), a MAC address proffered by a cable modem seeking to register with the cable system;
   forming a proffered MAC address/giaddr pair by combining the gateway interface address of the CMTS with the proffered MAC address;
   comparing components of the proffered MAC address/giaddr pair to the components of each of one or more MAC address/giaddr pairs stored in a datastore;
   making a determination whether the proffered MAC address/giaddr pair and any of the one or more stored MAC address/giaddr pairs satisfy a matching criteria comprising a same MAC address component and a different gateway interface address component; and
   in the event the proffered MAC address/giaddr pair and any of the one or more stored MAC address/giaddr pairs satisfy the matching criteria, selecting a remedial response, wherein the remedial response comprises denying the modem registration with the cable system.

2. The method for detecting unauthorized access of a cable system by a cable modem of claim 1, wherein the datastore comprises a central database.

3. The method for detecting unauthorized access of a cable system by a CM of claim 1, wherein the datastore comprises a distributed database.

4. The method for detecting unauthorized access of a cable system by a CM of claim 1, wherein the cable system comprises a DHCP server linked to the CMTS and wherein the DHCP server makes the determination with respect to the matching criteria.

5. The method for detecting unauthorized access of a cable system of claim 1, wherein the remedial response further comprises sending an advisory message to a network manager, and recording the event in a log file.

6. The method for detecting unauthorized access of a cable system by a CM of claim 1, wherein the method further comprises in the event that the proffered MAC address/giaddr pair and any of the one or more stored MAC address/giaddr pairs do not satisfy the matching criteria, storing the proffered MAC address/giaddr pair in the datastore.

7. A method for detecting unauthorized access of a cable system by a cable modem, wherein the cable system comprises a plurality of regional cable networks, the method comprising:
   receiving at a cable modem termination system (CMTS) a MAC address proffered by a cable modem seeking to register with the one of the plurality of regional cable networks;
   forming a proffered MAC address/giaddr pair by combining the gateway interface address of the CMTS with the proffered MAC address;

comparing components of the proffered MAC address/giaddr pair to the components of each of one or more MAC address/giaddr pairs stored in a regional datastore; and making a first determination whether the proffered MAC address/giaddr pair and any of the one or more regionally stored MAC address/giaddr pairs satisfy a matching criteria comprising a same MAC address component and a different gateway interface address component;

in the event the proffered MAC address/giaddr pair and any of the one or more stored MAC address/giaddr pairs satisfy the matching criteria, selecting a regional remedial response, wherein the regional remedial response comprises denying the modem registration with the cable system;

in the event that the proffered MAC address/giaddr pair and any of the one or more regionally stored MAC address/giaddr pairs do not satisfy the matching criteria, comparing the components of the proffered MAC address/giaddr pair to the components of each of one or more stored MAC address/giaddr pairs stored in a central datastore, wherein the central datastore comprises regionally stored MAC address/giaddr pairs from each of the regional datastores;

making a second determination whether the proffered MAC address/giaddr pair and any of the one or more centrally stored MAC address/giaddr pairs satisfy the matching criteria; and in the event the proffered MAC address/giaddr pair and any of the one or more centrally stored MAC address/giaddr pairs satisfy the matching criteria, selecting a central remedial response, wherein the central remedial response comprises denying the modem registration with the cable system.

8. The method for detecting unauthorized access of a cable system of claim 7, wherein the regional datastore and the central datastore each comprise a central database.

9. The method for detecting unauthorized access of a cable system of claim 7, wherein the regional datastore and the central datastore each comprise a distributed database.

10. The method for detecting unauthorized access of a cable system of claim 7, wherein the at least one of the plurality of regional cable networks further comprises a DHCP server linked to the CMTS and wherein the DHCP server makes the determination with respect to the first matching criteria.

11. The method for detecting unauthorized access of a cable system of claim 7, the method further comprising in the event the proffered MAC address/giaddr pair and any of the one or more of centrally stored MAC address/giaddr pairs does not satisfy the matching criteria, storing the proffered MAC address/giaddr pair in the regional datastore and the central datastore.

12. The method for detecting unauthorized access of a cable system of claim 7, wherein the regional remedial response further comprises sending a regional advisory message to a network manager, and recording a regional event in a log file and wherein the central remedial response further comprises sending central advisory message to the network manager, and recording a central event in the log file.

13. A system for detecting unauthorized access of a cable network by a cable modem, the system comprising:
a CMTS adapted to:
receive a MAC address of a CM seeking to register with the cable system; and form a proffered MAC address/giaddr pair by combining a gateway interface address of the CMTS with the MAC address; and
a detection server linked to a datastore, the detection server adapted to:
receive the proffered MAC address/giaddr pair from the CMTS;
compare the components of the proffered MAC address/giaddr pair to the components of each of one or more stored MAC address/giaddr pairs stored in the datastore; and
determine whether the proffered MAC address/giaddr pair and any of the one or more stored MAC address/giaddr pairs satisfy a matching criteria comprising a same MAC address component and a different gateway interface address component; and
in the event the proffered MAC address/giaddr pair and any of the one or more stored MAC address/giaddr pairs satisfy the matching criteria, select a remedial response, wherein the remedial response comprises denying the modem registration with the cable system.

14. The system of claim 13, wherein the datastore comprises a central database.

15. The system of claim 13, wherein the datastore comprises a distributed database.

16. The system of claim 13, wherein the remedial response further comprises sending an advisory message to a network manager and recording the event in a log file.

17. The system of claim 13, wherein the detection server is further adapted to, in the event the proffered MAC address/giaddr pair and any of the one or more stored MAC address/giaddr pairs do not satisfy the matching criteria, store the proffered MAC address/giaddr pair in the datastore.

18. The system of claim 13, wherein the detection server comprises a DHCP server.

19. A system for detecting unauthorized access of a cable network comprising a plurality of regional cable networks by a cable modem the system comprising:
a CMTS adapted to:
receive a MAC address of a cable modem seeking to register with one of the plurality of regional cable networks; and
form a proffered MAC address/giaddr pair by combining a gateway interface address of the CMTS with the MAC address; and
a regional detection server linked to a regional datastore, the regional detection server adapted to:
receive the proffered MAC address/giaddr pair from the CMTS;
compare the components of the proffered MAC address/giaddr pair to the components of each of one or more stored MAC address/giaddr pairs stored in the regional datastore; and
determine whether the proffered MAC address/giaddr pair and any of the one or more regionally stored MAC address/giaddr pairs satisfy a matching criteria comprising a same MAC address component and a different gateway interface address component; and
in the event the proffered MAC address/giaddr pair and any of the one or more regionally stored MAC address/giaddr pairs satisfy the matching criteria, select a regional remedial response, wherein the regional remedial response comprises denying the modem registration with the cable system;
in the event that the proffered MAC address/giaddr pair and any of the one or more regionally stored MAC address/giaddr pairs do not satisfy the first matching criteria, send the proffered MAC address/giaddr pair to a central detection server; and the central detection server linked to a central datastore, the central detection server adapted to:
- compare the components of the proffered MAC address/giaddr pair to the components of each of one or more stored MAC address/giaddr pairs stored in the central datastore, wherein the central datastore comprises regionally stored MAC address/giaddr pairs from each of the regional datastores;
- determine whether the proffered MAC address/giaddr pair and any of the one or more centrally stored MAC address/giaddr pairs satisfy the matching criteria;
- in the event the proffered MAC address/giaddr pair and any of the one or more centrally stored MAC address/giaddr pairs satisfy the matching criteria, select a central remedial response, wherein the central remedial response comprises denying the modem registration with the cable system.

20. The system of claim 19, wherein the regional datastore and the central datastore each comprise a central database.

21. The system of claim 19, wherein the regional datastore and the central datastore each comprise a distributed database.

22. The system of claim 19, wherein the regional detection server comprises a DHCP server.

23. The system of claim 19, wherein the regional remedial response further comprises sending a regional advisory message to a network manager and recording a regional event in a log file and where the central remedial response further comprises sending a central advisory message to the network manager and recording a central event in the log file.

24. The system of claim 19, wherein the central detection server is further adapted to, in the event the proffered MAC address/giaddr pair and any of the one or more centrally stored MAC address/giaddr pairs do not satisfy the matching criteria, store the proffered MAC address/giaddr pair in the regional datastore and the central datastore.

25. A method for detecting unauthorized access of a cable system by a cable modem, the method comprising:
- receiving at a cable modem termination system (CMTS) a MAC address of a cable modem seeking to register with the cable system;
- forming a proffered MAC address/giaddr pair by combining the gateway interface address of the CMTS with the proffered MAC address;
- comparing components of the proffered MAC address/giaddr pair to components of preauthorized identifiers in a datastore;
- in the event the components of the proffered MAC address/giaddr pair matches the components of a preauthorized identifier, granting the cable modem temporary registration with the cable system;
- requesting from the cable modem a confirmation identifier; and
- in the event the confirmation identifier is received from the cable modem, granting the cable modem registration with the cable system.

26. The method for detecting unauthorized access of a cable system by a cable modem of claim 25, the method further comprising in the event the proffered MAC address/giaddr pair does not matches a preauthorized identifier, selecting a remedial response.

27. The method for detecting unauthorized access of a cable system by a cable modem of claim 25, the method further comprising in the event the confirmation identifier is not received, terminating the temporary registration with the cable system.

* * * * *